United States Patent Office 2,965,587
Patented Dec. 20, 1960

2,965,587

OIL-MODIFIED ALKYD COMPOSITIONS WITH COAL ACIDS

Herbert B. Rickert, Midland, Mich., assignor to The Dow Chemical Company, Midland, Mich., a corporation of Delaware No Drawing. Filed Aug. 16, 1957, Ser. No. 678,514

11 Claims. (Cl. 260—22)

Oil-modified alkyd compositions are complex polyesters that are comprised of the reaction products are adducts of mixtures of polybasic organic acids, polyhydric alcohols and monobasic unsaturated fatty acids. In such compositions, the chemically combined fatty acids constituents act as a drying agent for the liquid polyester product by the mechanism of addition polymerization into which types of reaction the unsaturated bonds of the fatty acids are capable of entering. Besides possibilitating such function, the double bonds of the fatty acids may be made to copolymerize with styrene and other ethylenically unsaturated monomers to produce diverse types of compositions for various purposes in the event that such varieties of products should be desired.

The most common examples of oil-modified alkyds are the commercially available glycerol-phthalic anhydride polyesters that have been modified with an unsaturated fatty acids composition (or its glyceride) such as linseed oil, soya bean oil or the like. The trihydric nature of the glycerol in such a composition provides the necessary cross-linking to form a three dimensional polymer of the desired type. An analogous type of cross-linking can also be achieved when a combination of a tribasic acid and a glycol is used. In the latter case, the desired three dimensional cross-linking of the polyester results from the polybasicity of the acid.

Besides other uses, many of the oil-modified alkyds may comprise or furnish an excellent base for surface coatings of various types (including varnish-like and pigmented paint-like formulations) that form hard, fast-drying, solvent-resistant and scuff-proof films or protective coated layers. Many of the oil-modified alkyds that are available, however, including certain of those that are commonly employed, are relatively expensive materials.

The chief aim and concern of the present invention is to provide, on a more economical basis, new, useful and highly satisfactory oil-modified alkyds derived from certain polycarboxylic aromatic organic acids; fatty acids mixtures; and certain polyhydroxy compounds, which alkyds may be utilized as resins in any of the capacities generally fulfilled by the conventional alkyds and are especially adapted for application and utilization in surface coatings that have properties and characteristics which are at least commensurate, if not superior, to known analogous materials. The oil-modified alkyds of the present invention are comprised of (A) the polycarboxylic organic acid mixtures that are obtained from the oxidation of coal and the like carbonaceous materials, hereinafter referred to as coal acids; (B) unsaturated long chain fatty acids mixtures; and (C) normally liquid polyhydroxy compounds which may be classified as being higher glycols and are selected from the group consisting of normally liquid polyethylene glycols which contain at least four ethylene oxide units per molecule or may be said to be the products of condensation of at least four moles of ethylene oxide per mole of polyglycol product and which, in other words, are comprised of molecules that have a chain length of at least 13 atoms; normally liquid polypropylene glycols which contain at least two condensed propylene oxide units per molecule, normally liquid glycols and polyglycols which contain at least 4 carbon atoms (advantageously 4 to 8 carbon atoms) and at least one secondary hydroxyl group per molecule when less than 6 carbon atoms are present therein (such as 1,2-butylene glycol, 1,3-butylene glycol, 1,2-pentylene glycol, 1,6-hexylene glycol, 1,7-heptylene glycol, and 1,8-octylene glycol); and mixtures thereof; and equivalent higher glycols that contain at least about 7 atoms in their molecules and are normally liquid products such as polyglycols that are derived from mixtures of various alkylene oxides, particularly mixtures of ethylene oxide with higher alkylene oxides. It may frequently be most desirable and practical, from the standpoints of economy, availability and satisfactory results, to employ tetraethylene glycol; dipropylene glycol or tripropylene glycol as the polyhydroxy compound in the practice of the invention.

The oil-modified alkyds of the present invention may be conveniently prepared or obtained by reacting the coal acids, the glycol and the fatty acids mixtures at an elevated temperature, advantageously in the presence of a solvent vehicle, until the desired polyester reaction product is obtained. The solvent that is employed for such formational purpose may beneficially be selected as one that is capable of simultaneous function as a vehicle for the alkyd reaction product in surface coating compositions comprised thereof. The oil-modified alkyd compositions of the present invention are generally relatively dark colored materials that, as has been indicated, provide excellent surface coatings, invariably of a lighter yellow to brown color, which may be applied and air-dried or baked on after their application by whatever manner of drying may be best suited in individual instances. In addition to such applications, they frequently are also capable of being used as thermosettting, curable resins or as intermediates that are adapted to being further modified to form other beneficial products.

The oil-modified alkyd compositions of the present invention may advantageously be comprised of (or formed by the reaction between) from about 2.0 to 3.0 equivalents of the polyhydroxy compound, from about 1.9 to 0.2 equivalents of the coal acids and from about 0.1 to 1.8 equivalents of the unsaturated fatty acids mixtures. More advantageously, they may be comprised of from about 2.1 to 2.3 equivalents of the polyhydroxy compound, from about 1.8 to 0.8 equivalents of the coal acids and from about 0.3 to 1.2 equivalents of the fatty acids mixtures. The compositions which may be obtained are homogeneous mixtures having the indicated utilities that oftentimes may be made having an extremely low acid number less than, say, 10 or so. They are soluble in a wide variety of solvents, including benzene, toluene, xylene, xylol, dioxane, methyl ethyl ketone, methyl isobutyl ketone, various relatively fugacious aromatic and other hydrocarbon solvents, and the like or equivalent materials.

If desired, between about 2 and 5 percent by weight of the total charge of reacting ingredients may be comprised of maleic anhydride. The utilization of such an ingredient may beneficially serve to promote more rapid esterification during the reaction and tend to secure lighter coloration in the resulting product. Also, if desired, from 0.1 to 0.6 equivalents of the polyhydroxy compound constituent may consist of a polyhydroxy material which, in and of itself, is not adapted to provide homogeneous and otherwise suitable oil-modified alkyds of the indicated type in the practice of the invention. Included among such non-operable polyhydroxy compounds which may be used in the indicated minor proportions with those that may be suitably employed in the practice of the invention may be mentioned those selected from the group of non-operable glycols which consists of glycerine, ethylene glycol, diethylene glycol, triethylene glycol, propylene glycol and 1,5-pentanediol.

The exact ranges of ingredients that are employed in various circumstances in the practice of the present invention is somewhat dependent upon the extent of the esterification that may be desired to best meet the requirements of specific ends. For example, in order to obtain an oil-modified alkyd product having a low acid number, the average functionality of the total charge should not be much greater than about 2. In such cases, therefore, a relatively high proportion of the monobasic fatty acids mixture ingredient may advantageously be employed. If, on the other hand, products with high acid numbers are desired for such applications and utilizations as thermosetting resins, much smaller amounts of the monofunctional fatty acids mixture may be used without incurring intolerable gelation in the reaction product.

The oil-modified alkyds of the present invention may be formed readily in the indicated manner with conventional apparatus using reaction temperatures that are between about 100 and 300° C. Advantageously, the greatest portion of the reaction may be conducted at temperatures in the range from about 150 to 250° C. Other temperatures may also be found operable and either sub-atmospheric, atmospheric, or superatmospheric pressures may be utilized for conducting the reaction. If desired, an acid catalyst such as sulfuric acid or its organic and inorganic equivalents for such esterification purposes may be optionally employed to facilitate the reaction. A very convenient form of catalyst that may be employed in the preparation of the oil-modified alkyd compositions of the present invention is the acid varieties of certain ion-exchanging resins, including sulfonated polystyrene resins that are in free acid form and the like materials (such as that which is available from the Dow Chemical Company under the trade-designation "Dowex 50"). This form of acid-resin catalyst may be easily removed from the reaction mass by filtration upon termination of the reaction.

Whether or not a catalyst is employed, the reaction usually proceeds at a moderate rate at the lower end of the indicated temperature range and at a much faster rate at the higher end thereof. By way of illustration in catalyzed reactions that are conducted at about 155° C., the alkyd-forming reaction is ordinarily found to be about 75 percent complete within an hour. At higher temperatures, slightly greater conversions are usually experienced within the same period of time. Without use of a catalyst, a somewhat slower reaction may be experienced. In general, the first stages of esterification, regardless of the conditions under which it is conducted, are found to be relatively rapid and the latter stages relatively slow. The reaction rates that are experienced in the preparation of the oil-modified alkyds of the present invention are ordinarily similar to those which are experienced in the performance of other alkyd-forming reactions. The precise rate of reaction in any given instance is usually found to be influenced by the rate of increase in viscosity, temperature, concentration, and rate of stirring. If desired, the reaction may also be facilitated by sparging the reaction mass during the course of the reaction with an inert gas, such as nitrogen.

The coal acids that are employed to prepare the excellent, yet relatively inexpensive, alkyd compositions in the practice of the invention may be identical with or similar to those which may be obtained by the oxidation with gaseous oxygen, which may be contained in air, of an aqueous alkaline slurry of a finely divided carbonaceous material selected from the group consisting of coal and coke that has been obtained by the carbonization of coal at temperatures beneath about 700° C. Coal acids that have been obtained by the nitric acid oxidation of suitable carbonaceous materials are also generally satisfactory, as are equivalent synthetic mixtures which may, if desired, be provided. Such coals that are of the varieties known as anthracite, bituminous, sub-bituminous and lignite and other low grade coals are generally suitable for production of coal acids. Satisfactory cokes are those produced according to conventional techniques from coal at a temperature beneath about 700° C. The utilization of higher coking temperatures frequently causes the cokes that are obtained to be graphitic and rendered unsuitable for conversion to coal acids in satisfactory yields.

The free coal acids product is a hygroscopic, usually yellowish, essentially water soluble material. It is believed to be substantially comprised of various aromatic polycarboxylic acids. The average molecular weight of the coal acids that are ordinarily obtained (as indicated, for example, by means of boiling point elevations) is frequently in the neighborhood of 250–270 or so; seldom being less than 200 or more than 300. Their average equivalent weight is generally about 80; usually being more than 70 and rarely more than 90. They ordinarily appear to have an average of about 2.5 to 5 carboxylic groups per molecule with an apparent average of about 3 to 4 being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids prepared in the described fashion have been found to consist of methylnaphthalene, benzene, biphenyl, naphthalene, phenanthrene, alkyl benzene, benzophenone and toluene nuclei. As might be expected, the free coal acids are a chemical commodity which, besides other of their desirable features and aptitudes, have the general attractiveness of low cost in their favor.

Practically any of the conventionally employed, commercially available mixtures of unsaturated "drying oil" fatty acids may be utilized in the practice of the present invention. Such materials, according to common concepts, generally contain mixtures of various unsaturated drying oil fatty acids that may have from about 12 to 22 carbon atoms in their molecules. The ordinarily encountered fatty acids mixtures that may be employed with especial benefit in the practice of the present invention include tall oil fatty acids, linseed oil fatty acids and soya bean oil fatty acids. Of course, blends of such fatty acids mixtures may also be utilized, oftentimes with decided benefit for purposes of obtaining products with unique and individualized properties and characteristics. In this connection, it is generally undesirable in the practice of the invention to use a substantially pure, unmixed, single unsaturated fatty acid for preparation of the alkyd products. Use of such material commonly is disadvantageous and results in markedly inferior and dissatisfactory products as compared to the alkyd compositions obtainable with the conventional fatty acids mixtures.

As will be recognized by those who are skilled in the art, the drying characteristics of the coal acid alkyds of the present invention are strongly dependent upon the precise nature of the specific fatty acids mixture constituent that is utilized for their preparation. Air-drying films of coal acid alkyds can generally be obtained if fatty acids mixtures of sufficient unsaturation are used. Thus, compositions that have been prepared with linseed oil fatty acids are generally capable of producing films which can be completely air-dried in about 24 hours or less. On the other hand, tall oil and the like fatty acids mixtures usually produce alkyd products which are best dried when baked on or over the surface to which they are applied or which may be more advantageously utilized as thermosetting resins for binders and the like applications. Of course, conventional "driers" such as lead and cobalt naphthenates and the like may advantageously be utilized in the compositions of the invention to ameliorate their drying characteristics.

When the oil-modified alkyds of the present invention are provided in a solvent base, it is usually advantageous (especially for surface coating purposes) for the solvent-containing composition to be made up with between about 50 and 75 percent or so by weight of total resinous solids, based on the weight of the total composition. As mentioned in the foregoing, many paint-like coatings may also be prepared from the oil-modified alkyd compositions of the invention, if such products happen to be desired, by incorporating therein conventional quantities of pigments, fillers, extenders and the like, particularly when the alkyds have been formulated in and with a solvent vehicle.

The invention is further illustrated by the following examples wherein, unless otherwise indicated, all parts and percentages are to be taken by weight.

Example 1

The below listed ingredients were charged to a 1 liter resin flask (or pot) that was fitted with a water take-off unit, an efficient stirring mechanism, a temperature indicating means, an inlet tube for nitrogen sparging and an electric heating mantel:

50 grams water.
104 grams of free coal acids.
83 grams 1,2-butylene glycol.
140 grams linseed oil fatty acids.
25 milliliters xylene.

The coal acids that were employed had an average molecular weight of about 284, an average apparent weight of about 84.6, an average functionality (or number of carboxylic acid groups per molecule) of about 3.36 and a carbon-to-hydrogen ratio of about 1.46; being comprised of about 54.36 percent of carbon, 3.10 percent hydrogen, 0.52 percent nitrogen and 0.16 percent sulfur.

The charged ingredients were held at a temperature in the flask between about 110 and 120° C. until the original 50 grams of water had distilled off. The temperature was then gradually raised over a period of 3¼ hours to about 200° C. At the end of this period, the temperature was raised to 240° C. and synthermally maintained thereat for an additional 1½ hour period. The reaction mass was then permitted to cool until it reached a temperature of about 160° C., at which point about 197 ml. of xylene was added to give a solution of about 60 percent of oil-modified alkyd resin solids (having a dark brown shade of coloration) in the solvent. The resulting 60 percent resin solution was completely homogenous. It had an acid number of about 27, (usually expressed as milligrams of potassium hydroxide to neutralize each gram of material being tested), calculated on a 100 percent solids basis as determined by tritrating a sample of the alkyd with 0.2 N sodium hydroxide in a 50 percent benzene-ethanol solvent with a phenolphthalein indicator. Based upon the titration, the acid number was computed according to the following formula:

Acid number (mg. KOH/gm.)
$$= \frac{(\text{Volume NaOH})\ (\text{N NaOH}) \times 56.1}{\text{Weight of sample}}$$

The 60 percent resin solution was cast as a two mil film on a glass plate. The film dried to a tack-free condition within about a 4 hour period at room temperature. It had a yellowish-brown appearance and was found to have a Sward hardness of about 6.

Example 2

Following the general procedure of the first example, an oil-modified alkyd resin was prepared from the following charge:

50 grams water.
104 grams coal acids (same as in Example 1).
100 grams dipropylene glycol.
19 grams propylene glycol.
149 grams linseed oil fatty acids.
25 ml. xylene.

The thereby obtained alkyd product was made up to a 60 percent resin solids content solution in xylene. The dark colored resin solution had a Gardner viscosity of Z. It was cast as a three mil film over a glass plate. The cast film dried to a tack-free condition at room temperature within 29 hours to form a brownish coating having a Sward hardness of about 2.

Example 3

Following the procedure of Example 1, another oil-modified alkyd resin product was prepared using the following ingredients for the reaction:

150 grams water.
285 grams coal acids (same as in Example 1).
249 grams 1,3-butylene glycol.
30 grams maleic anhydride.
420 grams linseed oil fatty acids.
75 ml. xylene.

The esterification was accomplished more quickly than in the first example. The acid number of the resulting alkyd was about 30. It was prepared into a 50 percent resin solution in xylene that had a Gardner viscosity of about B. The resin solution was cast as a light yellow brown, two mil film on a glass plate which air-dried in 1½ hours at room temperature to a coating having a Sward hardness of 5.

Example 4

Using the foregoing procedure, another oil-modified alkyd product was made from the following charge:

83 grams coal acids (same as in Example 1).
121 grams dipropylene glycol.
196 grams tall oil fatty acids.
10 grams maleic anhydride.
9 grams glycerine.
4 grams "Dowex 50."
25 ml. xylene.

The tall oil fatty acids that were employed were obtained from the Arizona Chemical Company under the trade designation "Actinol FA-2." Their analysis was as follows:

| | |
|---|---|
| Fatty acids _____ percent__ | 96.8 |
|    Linoleic acid in fatty acids _____do____ | 48 |
|    Oleic acid in fatty acids _____do____ | 50 |
|    Saturated acids in fatty acids _____do____ | 2 |
| Rosin acids _____do____ | 1 |
| Unsaponifiable material _____do____ | 2.2 |
| Acid number _____ | 194 |
| Iodine number _____ | 130 |
| Gardner color number _____ | 6+ |
| Gardner viscosity _____ | A |
| Specific gravity (25/25° C.) _____ | 0.9 |

After the ingredients were charged to the flask, heating was commenced. The first drop of water came off at a pot temperature of about 145° C. The temperature of the reaction mass was raised gradually over a period of 3½ hours to 200° C. and held at this point for an additional 3¼ hours. The temperature was then raised to about 240° C. over an additional ¾ hour period and held at the higher level for 6 more hours. The reaction mass was then cooled and reduced with xylene to prepare a 60 percent solution of the dark colored resin solids in the solvent. The resulting alkyd solution was filtered to remove the solid catalyst therefrom. The alkyd product was found to have an acid number of about 9.6, on a 100 percent solids basis. The solution of the resin was found to provide excellent coatings when applied over various substrates and baked thereon at a temperature of about 110° C. for a period of about 30 minutes.

Example 5

In order to illustrate the effect of particular glycol ingredients on the homogeneity of the reaction mass, a series of experiments were performed in which various ethylene glycols were utilized in an attempt to prepare alkyd products. In each of the experiments, about 2.20 equivalents of the glycol were charged into the resin flask along with 1.25 equivalents of coal acids and 0.75 equivalent of tall oil fatty acids. The glycols that were employed were ethylene glycol, diethylene glycol, triethylene glycol and tetraethylene glycol. Each of the reactions was conducted in general accordance with the manner set forth in the preceding examples, using reaction temperatures of from about 150 to 200° C. All of the products excepting that prepared with tetraethylene glycol were found to be non-homogeneous and to have formed a gelatinous precipitate or gel phase in the reaction mass. A precipitate constituting about 52 percent of the total charged ingredients was formed with the ethylene glycol; another precipitate of about 39 percent of the charge with the diethylene glycol; and one of about 12 per of the total charge with the triethylene glycol. In contrast, no precipitate was formed in the reaction mass with tetraethylene glycol. Rather a uniform, entirely homogeneous, excellent quality alkyd product was obtained.

Example 6

Another series of experiments was performed with different glycols using the same basic charge proportions in each experiment as in Example 5. In each of the experiments, the temperature at which the reaction mass became homogeneous was observed. The results are set forth in the following tabulations, wherein the particular glycols which were utilized are described and the temperature of homogeneity is indicated wherever such condition was attained.

| Glycol: | Temperature of homogeneity, °C. |
|---|---|
| Ethylene | None (formed gel) |
| Diethylene | Do. |
| Triethylene | Do. |
| Tetraethylene | 195 |
| Propylene | None (formed gel) |
| Dipropylene | 143 |
| Tripropylene | 112 |
| 1,2-butylene | 183 |
| 1,6-hexylene | 110 |
| 1,8-octylene | 90–95 |

Excellent results may also be obtained when other oil-modified alkyd products are prepared from other operable glycol ingredients and fatty acids mixtures within the scope of the invention.

What is claimed is:

1. An oil-modified alkyd composition comprised of the esterified product of reaction between (a) from 2 to 3 equivalents of a polyhydroxy glycol compound selected from the group consisting of normally liquid polyethylene glycols that contain at least four condensed ethylene oxide units in their molecules, normally liquid polypropylene glycols that contain at least two condensed propylene oxide units in their molecules; normally liquid glycols and polyglycols that contain at least 4 carbon atoms in their molecules and have at least one secondary hydroxyl substituent group when they consist of less than 6 carbon atoms, and mixtures thereof; (b) from about 0.1 to 1.80 equivalents of a monobasic unsaturated drying oil fatty acids mixture; and (c) from about 1.9 to 0.2 equivalents of coal acids which are the water-soluble mixed aromatic polycarboxylic acids of the class that are the product of the oxidation of coal and have an average molecular weight of from 200 to 300, an apparent average equivalent weight of from 70 to 90, and contain an average of from 2.5 to 5 carboxylic groups per aromatic nucleus in their molecule.

2. The oil-modified alkyd composition of claim 1, wherein the unsaturated drying oil fatty acids mixture contains fatty acid constituents of from 12 to 22 carbon atoms in their molecules.

3. The oil-modified alkyd composition of claim 1, wherein the unsaturated drying oil fatty acids mixture is linseed oil fatty acids.

4. The oil-modified alkyd composition of claim 1, wherein the unsaturated drying oil fatty acids mixture is soya bean oil fatty acids.

5. The oil-modified alkyd composition of claim 1, wherein the unsaturated drying oil fatty acids mixture is tall oil fatty acids.

6. The oil-modified alkyd composition of claim 1, wherein the polyhydroxy compound is tetraethylene glycol.

7. The oil-modified alkyd composition of claim 1, wherein the polyhydroxy compound is dipropylene glycol.

8. The oil-modified alkyd composition of claim 1, wherein the polyhydroxy compound is tripropylene glycol.

9. An oil-modified alkyd composition that is in accordance with that set forth in claim 1 and containing, in addition to the ingredients therein recited, between about 2 and 5 percent by weight of the total weight of ingredients of maleic anhydride.

10. An oil-modified alkyd composition in accordance with the composition set forth in claim 1 and containing in addition to the ingredients therein recited and as part of said polyhydroxy constituent, up to about 0.6 equivalent of an additional polyhydroxy compound selected from the group consisting of glycerine, ethylene glycol, diethylene glycol; triethylene glycol, propylene glycol, and mixtures thereof.

11. The oil-modified alkyd composition of claim 1 comprised of the esterified product of reaction between about 2.1 and 2.3 equivalents of said polyhydroxy compound; between about 1.8 and 0.8 equivalents of said coal acids; and between about 3.0 and 1.2 equivalents of said fatty acids mixture.

References Cited in the file of this patent

UNITED STATES PATENTS

| 2,562,878 | Blair | Aug. 7, 1951 |
| 2,585,323 | Ewell et al. | Feb. 12, 1952 |